United States Patent
Zhang et al.

(10) Patent No.: US 11,471,831 B2
(45) Date of Patent: Oct. 18, 2022

(54) METHOD OF REGENERATING A DENO$_x$ CATALYST

(71) Applicant: SHELL OIL COMPANY, Houston, TX (US)

(72) Inventors: Wenzhong Zhang, Houston, TX (US); Geert Marten Bakker, Amsterdam (NL); Steven Russell Lee, Houston, TX (US)

(73) Assignee: SHELL USA, INC., Houston, TX (US)

( * ) Notice: Subject to any disclaimer, the term of this patent is extended or adjusted under 35 U.S.C. 154(b) by 644 days.

(21) Appl. No.: 16/335,461

(22) PCT Filed: Sep. 25, 2017

(86) PCT No.: PCT/EP2017/074241
§ 371 (c)(1),
(2) Date: Mar. 21, 2019

(87) PCT Pub. No.: WO2018/055165
PCT Pub. Date: Mar. 29, 2018

(65) Prior Publication Data
US 2019/0240620 A1    Aug. 8, 2019

Related U.S. Application Data

(60) Provisional application No. 62/399,552, filed on Sep. 26, 2016.

(51) Int. Cl.
| | | |
|---|---|---|
| *B01D 53/96* | (2006.01) | |
| *B01J 38/06* | (2006.01) | |
| *B01D 53/86* | (2006.01) | |
| *B01J 35/04* | (2006.01) | |
| *B01J 23/90* | (2006.01) | |
| *B01J 38/12* | (2006.01) | |
| *B01J 23/22* | (2006.01) | |
| *B01J 23/92* | (2006.01) | |
| *B01J 38/02* | (2006.01) | |

(52) U.S. Cl.
CPC ......... *B01D 53/96* (2013.01); *B01D 53/8625* (2013.01); *B01J 23/22* (2013.01); *B01J 23/90* (2013.01); *B01J 23/92* (2013.01); *B01J 35/04* (2013.01); *B01J 38/02* (2013.01); *B01J 38/06* (2013.01); *B01J 38/12* (2013.01); *B01D 2251/2062* (2013.01); *B01D 2255/20723* (2013.01); *B01D 2257/404* (2013.01); *B01D 2258/0283* (2013.01)

(58) Field of Classification Search
CPC ............... B01D 53/96; B01D 53/8625; B01D 2251/2062; B01D 2255/20723; B01D 2257/404; B01J 23/22; B01J 23/92; B01J 38/02; B01J 38/06
USPC .......................................................... 502/56
See application file for complete search history.

(56) References Cited

U.S. PATENT DOCUMENTS

| | | | |
|---|---|---|---|
| 4,572,903 | A | 2/1986 | Hino et al. |
| 7,595,033 | B2 | 9/2009 | Frey et al. |
| 8,883,106 | B2 | 11/2014 | Buschmann et al. |
| 9,784,164 | B2 | 10/2017 | Mori et al. |
| 2008/0089822 | A1 | 4/2008 | Frey et al. |
| 2009/0247392 | A1 | 10/2009 | Ghorishi et al. |
| 2010/0061906 | A1 | 3/2010 | Buschmann et al. |
| 2014/0237995 | A1 | 8/2014 | Yezerets et al. |
| 2019/0083967 | A1 | 3/2019 | Yang et al. |

FOREIGN PATENT DOCUMENTS

| | | |
|---|---|---|
| CN | 1107876 A | 9/1995 |
| CN | 102008893 A | 4/2011 |
| CN | 203140020 U | 8/2013 |
| CN | 104190478 A | 12/2014 |
| CN | 204973599 U | 1/2016 |
| CN | 105688936 A | 6/2016 |
| CN | 108722436 A | 11/2018 |
| DK | 2570177 T3 | 5/2016 |
| DK | 2486971 T3 | 6/2017 |
| EP | 0136966 A2 | 4/1985 |
| EP | 0303560 A1 | 2/1989 |
| EP | 1870155 A1 | 12/2007 |
| EP | 2321035 A1 | 5/2011 |
| EP | 2486971 A1 | 8/2012 |
| EP | 2570177 A1 | 3/2013 |
| EP | 3015670 A1 | 5/2016 |
| JP | S52111463 A | 9/1977 |
| JP | S52150795 A | 12/1977 |
| JP | S5478359 A | 6/1979 |
| JP | S55116443 A | 9/1980 |
| JP | S55167025 A | 12/1980 |
| JP | S5637036 A | 4/1981 |
| JP | S5719022 A | 2/1982 |
| JP | H0544224 U | 6/1993 |
| JP | H05285343 A | 11/1993 |
| JP | H09225310 A | 9/1997 |
| JP | 2005087815 A | 4/2005 |
| JP | 2016007554 A | 1/2016 |

OTHER PUBLICATIONS

Baoxiang et al., "Vanadium-based Materials Manufacturing", Metallurgical Industry Press, Mar. 31, 2014, 6 pages.

(Continued)

*Primary Examiner* — Edward M Johnson
(74) *Attorney, Agent, or Firm* — Shell USA, Inc.

(57) ABSTRACT

A method for regenerating a deNO$_x$ catalyst includes contacting the catalyst with steam at a temperature in the range of from 250 to 390° C. The method also includes reducing the amount of nitrogen oxide components in a process gas stream that includes a) contacting the process gas with a deNO$_x$ catalyst which results in the conversion of nitrogen oxide components as well as a decline in the NO$_x$ conversion over the deNO$_x$ catalyst; and b) regenerating the deNO$_x$ catalyst to improve the NO$_x$ conversion by contacting the deNO$_x$ catalyst with steam at a temperature in the range of from 250 to 390° C.

6 Claims, 1 Drawing Sheet

(56) References Cited

OTHER PUBLICATIONS

International Search Report and Written Opinion received for PCT Patent Application No. PCT/EP2017/074241, dated Nov. 22, 2017, 9 pages.
International Search Report and Written Opinion received for PCT Patent Application No. PCT/EP2017/074234, dated Nov. 27, 2017, 9 pages.

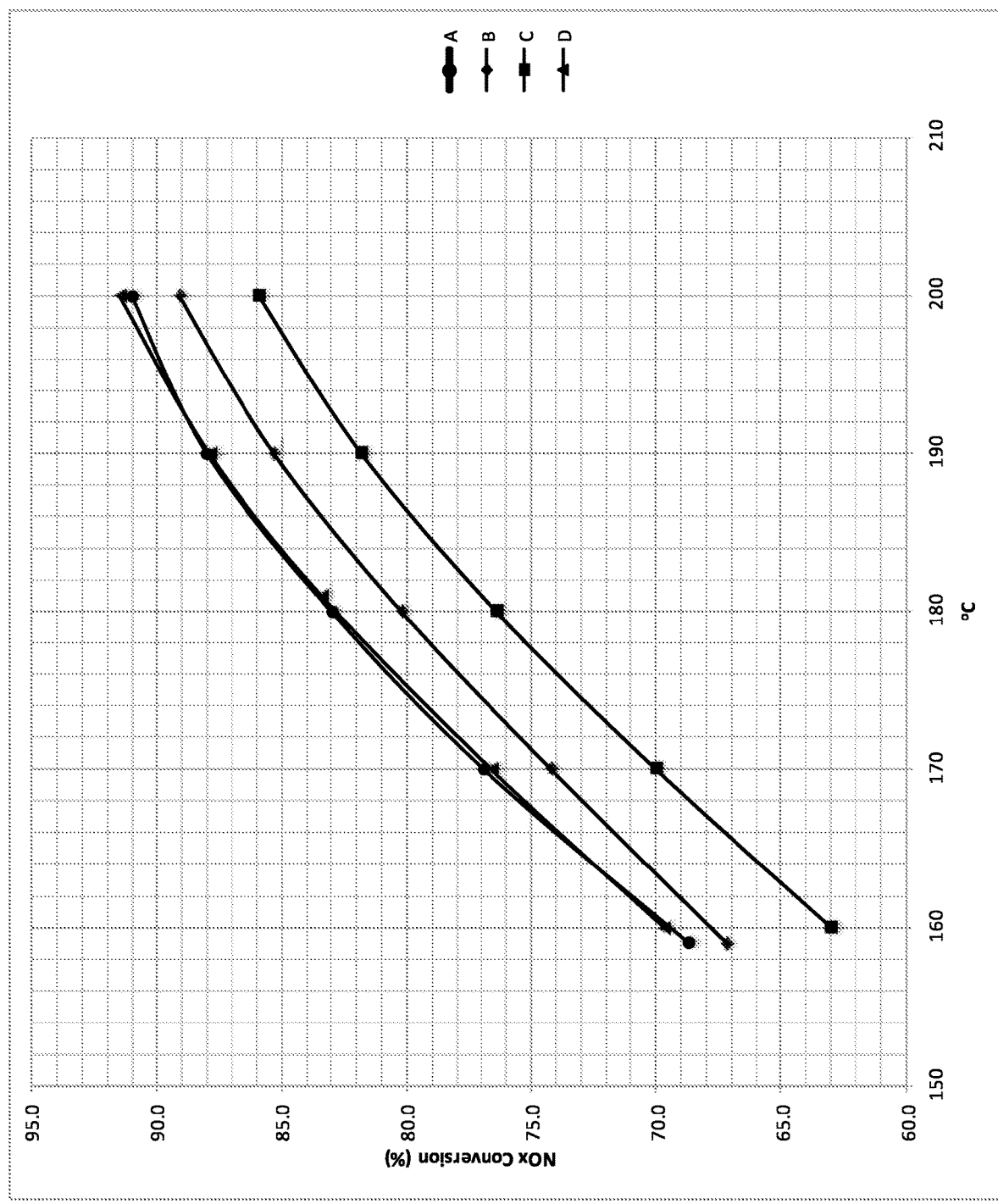

METHOD OF REGENERATING A DENO$_x$ CATALYST

PRIORITY CLAIM

The present application is the National Stage (§ 371) of International Application No. PCT/EP2017/074241, filed 25 Sep. 2017, which claims priority from U.S. patent application Ser. No. 62/399,552, filed 26 Sep. 2016 incorporated herein by reference.

FIELD OF THE INVENTION

The invention relates to a method of regenerating a deNO$_X$ catalyst and a method for reducing the amount of nitrogen oxide components in a process gas stream.

BACKGROUND

Process gas, such as combustion exhaust gas streams and that from other processes, for example processes in a caprolactam plant, typically contain nitrogen oxides, NO$_X$, that are produced during the process or combustion. One process for reducing the level of nitrogen oxides is the selective catalytic reduction (SCR) process. In this process, nitrogen oxides are converted over a deNO$_X$ catalyst to nitrogen and water using ammonia or substances which form ammonia under the SCR conditions.

The process gas stream may also comprise various contaminants that are a result of the process or combustion step, for example, sulfur dioxide, sulfur trioxide, phosphorous, heavy metals, alkali metals and alkaline earth metals. These contaminants may cause fouling and/or poisoning of the deNO$_X$ catalyst which results in reduced NO$_X$ conversion over the catalyst. The catalyst performance can degrade to the point where a regeneration step is required to regain the loss of NO$_X$ conversion rate or else the catalyst would have to be replaced. Various deNO$_X$ catalyst regeneration methods have been described in the prior art, but these typically require the removal of the catalyst from the process for washing with a liquid or for thermally treating at high temperatures, in excess of 400° C. It would be advantageous to develop a regeneration method that could be carried out without taking the catalyst off-line or allowing the catalyst to be thermally regenerated at a lower temperature or in a shorter period of time.

SUMMARY OF THE INVENTION

The invention provides a method for regenerating a deNO$_X$ catalyst comprising contacting the catalyst with steam at a temperature in the range of from 250 to 390° C.

The invention further provides a method of reducing the amount of nitrogen oxide components in a process gas stream comprising: a) contacting the process gas with a deNO$_X$ catalyst which results in the conversion of nitrogen oxide components as well as a decline in the NO$_X$ conversion over the deNO$_X$ catalyst; and b) regenerating the deNO$_X$ catalyst to improve the NO$_X$ conversion by contacting the deNO$_X$ catalyst with steam at a temperature in the range of from 250 to 390° C.

BRIEF DESCRIPTION OF THE DRAWINGS

Figure depicts the results of Example 3.

DETAILED DESCRIPTION

The invention provides an improved method for regenerating deNO$_X$ catalyst, especially deNO$_X$ catalyst showing a reduced NO$_X$ conversion caused by sulfur-containing compounds in the process gas. This provides an improved NO$_X$ reduction process with extended catalyst life and reduced downtime of the deNO$_X$ unit(s).

The deNO$_X$ catalyst may be any deNO$_X$ catalyst known in the art for reducing the concentration of nitrogen oxides in a process gas stream. The deNO$_X$ catalyst may contain titanium, tungsten, molybdenum, vanadium or other compounds known to be suitable for the conversion of nitrogen oxides to nitrogen and water. The catalyst may be in any suitable shape or it may be a wash coat on a substrate, for example the catalyst may be an extruded honeycomb, a wash coated metal plate, a wash coated corrugated plate or on a foam substrate. In another embodiment, the catalyst may be in the form of pellets.

The process gas may be produced in heaters, furnaces, direct fired boilers, or by any other combustion process or other process. The process gas may contain any number of products, including carbon monoxide, carbon dioxide, nitrogen oxides, sulfur compounds, and other contaminants present in the feed streams that are combusted or otherwise processed in addition to particulates which may contain phosphorous, heavy metals, alkali metals and alkaline earth metals. The sulfur compounds may be sulfur oxides, for example sulfur dioxide and sulfur trioxide. The sulfur compounds are typically generated as a result of sulfur being present in the feed streams, which could include fuel oil or other hydrocarbon streams, coal or waste such as municipal waste, industrial waste and hospital waste.

The process gas may be treated for the removal of any or all of these products and contaminants, and the treating is typically determined by the relevant environmental regulations. The process gas is passed through one or more treatment zones that may comprise one or more catalysts. For example, the process gas may be passed through electrostatic precipitators or fabric filters to remove a portion of the particulates and acid gas removal systems to remove a portion of the acid gases including sulfur dioxide and sulfur trioxide.

The process gas is contacted with a deNO$_X$ catalyst, typically in the presence of ammonia, to convert the nitrogen oxides to nitrogen and water. The catalyst may present in a catalyst module, for example a honeycomb or plate type catalyst module as well as a lateral flow reactor, radial flow reactor or axial flow reactor. The deNO$_X$ reaction may be conducted at a temperature of from 140 to 300° C.

Over time, the NO$_X$ conversion over the deNO$_X$ catalyst is reduced. This may be a result of the active sites being physically covered, i.e., with particulates and/or the active sites chemically reacting with other process gas components in a way that they are no longer active for nitrogen oxide conversion. Dust and/or other particulates from the process gas may be physically deposited on the catalyst surfaces, and over time more and more sites will be obscured. Ammonium sulfate, ammonium bisulfate and other ammonium salts, such as ammonium chloride and ammonium nitrate, may form through the reaction of injected ammonia with components in the process gas. These ammonium salts may condense or otherwise deposit on the catalyst increasing the sulfur concentration on the catalyst.

In addition, sulfur compounds, such as sulfur oxides may deposit on the catalyst, to increase the sulfur concentration on the catalyst and result in a reduction in NO$_X$ conversion. As the process gas passes across the deNO$_X$ catalyst, the concentration of sulfur deposited on the catalyst increases. The sulfur content may increase to a concentration of more than 0.2 wt % on the catalyst, calculated as elemental sulfur as a percentage of the total weight of the catalyst. The amount of sulfur on the catalyst may increase even higher to 1.0 wt % or 2 wt % or even higher concentrations. The $NO_X$ conversion over the catalyst will be reduced as a result of this concentration of sulfur on the catalyst.

In order to regenerate the $deNO_X$ catalyst, it is contacted with steam under regeneration conditions. These regeneration conditions include desired temperature, flow rates, steam content and regeneration time. The steam may be produced in a high pressure boiler nearby, be part of the steam utility system or be produced in the same processes that produce the process gas to be treated. This last embodiment is especially useful because the steam is produced at almost the same place as where it needs to be used for the regeneration.

The regeneration may be carried out at the same temperature that the process gas contacts the catalyst or the steam may provide sufficient heat to heat the catalyst to a higher temperature during the regeneration. Alternatively, heat may be provided by heaters or other heat sources. The regeneration temperature is preferably in the range of from 250 to 390° C., more preferably in the range of from 250 to 370° C., and even more preferably in the range of from 290 to 350° C. In another embodiment, the temperature may be in the range of from 310 to 350° C.

The pressure in the regeneration step is typically at or near ambient pressure.

During the regeneration step, in addition to the steam, the catalyst may be contacted with a flow of air.

In another embodiment, the catalyst may continue to be contacted with the process gas during the regeneration step. In this embodiment, the amount of steam that is needed will depend on the amount of steam that may already be present in the process gas. If the process gas continues to pass through the catalyst, then the underlying process does not have to be stopped during the regeneration step.

The flow of process gas may be reduced during the regeneration step. The flow may be reduced to 50% of its normal flow, preferably 25% of its normal flow, more preferably to 10% of its normal flow and most preferably to 5% of its normal flow. The flow may be reduced to 2 to 5% of its normal flow. In one embodiment, the flow of the process gas may be stopped. The flow of the process gas may be stopped when steam and/or air are fed during the regeneration step.

The catalyst may be contacted with an amount of steam of from 10 to 50 vol. % of the total gas stream during the regeneration step. The total gas stream may comprise from 15 to 40 vol. % of steam.

During the regeneration the ammonia that is typically contacted with the catalyst and process gas during $deNO_X$ operation may be stopped or it may continue to flow at a reduced flow rate. In a preferred embodiment, the ammonia flow is stopped during the regeneration.

The steam and optionally air flow through the catalyst during the regeneration step can unlock ammonium salts which are then decomposed and removed from the catalyst. This improves the performance of the catalyst and helps to return the $NO_X$ conversion rate to at least 50% of the $NO_X$ conversion rate of fresh catalyst.

The regeneration step also removes sulfur compounds present on the catalyst. The regeneration can reduce the level of sulfur on the catalyst to less than 1.3 wt %, preferably less than 0.9 wt % and more preferably to less than 0.6 wt % of sulfur on the catalyst.

The regeneration may be carried out for a sufficient time period to restore the catalyst to at least 50% of its initial $NO_X$ conversion rate, preferably at least 80% of its original $NO_X$ conversion rate, more preferably at least 90% of its initial $NO_X$ conversion rate, and even more preferably at least 95% of its initial $NO_X$ conversion rate. The regeneration may be carried out for a time period of from 5 to 168 hours, preferably from 12 to 72 hours, and more preferably from 24 to 48 hours.

EXAMPLES

In the examples, $deNO_X$ catalyst that was used in two different industrial locations to treat process gas was tested and then regenerated under different conditions to determine the effect on $NO_X$ conversion of the catalyst.

Example 1

In this example, an industrial $deNO_X$ catalyst was regenerated after it was used to treat process gas. The catalyst was a vanadium-containing $deNO_X$ catalyst in the form of trilobes. The catalyst was regenerated under 4 different sets of conditions as shown in Table 1. The measured $NO_X$ conversion of the catalyst is shown in table 2 as well as a column showing the conversion recovery. Conversion recovery is defined as the $NO_X$ conversion of the regenerated catalyst divided by the $NO_X$ conversion of fresh catalyst. Table 2 also shows the amount of sulfur on the catalyst. Table 2 shows the above data for fresh catalyst, for catalyst after it has been used to treat process gas and then after each of the regeneration conditions shown in Table 1.

TABLE 1

| Regeneration Condition | A | B | C | D |
|---|---|---|---|---|
| Air flow ($hr^{-1}$) | 1000 | 1000 | 1000 | 1000 |
| H2O (vol. %) | 30 | 40 | 30 | 30 |
| T (° C.) | 350 | 350 | 325 | 310 |
| Duration (hrs) | 48 | 24 | 48 | 48 |

TABLE 2

|  | Fresh catalyst | After use | A | B | C | D |
|---|---|---|---|---|---|---|
| $NO_X$ Conversion (%) | 76.0 | 23.5 | 76.7 | 72.3 | 75.1 | 68.3 |
| Conversion Recovery (%) |  |  | 101 | 95.1 | 98.8 | 89.9 |
| Sulfur (wt %) | 0.10 | 4.30 | 0.29 | 0.41 | 0.55 | 1.18 |

As can be seen from the tables, the regeneration process using steam under regeneration conditions is effective in restoring the $NO_X$ conversion rate of the $deNO_X$ catalyst to or close to its original $NO_X$ conversion rate.

Example 2

In this example, the same type of catalyst was contacted under different industrial conditions with a different process gas. In this example, the catalyst was regenerated under different conditions, some of which included the continued contacting with process gas (or process gas components, such as $NO_X$ and $SO_2$). Table 3 shows the different regeneration conditions. Table 4 shows the catalyst performance and other data for fresh catalyst, after use in the SCR process and then after each of the regeneration conditions shown in Table 3.

TABLE 3

| Regeneration Condition | E | F | G | H | I |
|---|---|---|---|---|---|
| Air flow (hr$^{-1}$) | 1000 | 1000 | 1000 | 1000 | 1000 |
| H$_2$O (vol. %) | 30 | 15 | 40 | 20 | 20 |
| NO$_x$ (ppmv) | 0 | 0 | 200 | 200 | 200 |
| SO$_2$ (ppmv) | 0 | 0 | 0 | 0 | 8 |
| T (° C.) | 325 | 325 | 325 | 325 | 325 |
| Duration (hrs) | 48 | 48 | 24 | 24 | 24 |

TABLE 4

| | Fresh catalyst | After use | E | F | G | H | I |
|---|---|---|---|---|---|---|---|
| NO$_x$ Conversion (%) | 76.0 | 45.9 | 75.2 | 71.8 | 75.5 | 72.5 | 72.8 |
| Conversion Recovery (%) | | | 98.9 | 94.5 | 99.3 | 95.4 | 95.8 |
| Sulfur (wt %) | 0.10 | 1.95 | 0.64 | 0.88 | 0.82 | 1.13 | 1.22 |

As can be seen from Example 2, the regeneration process is effective even when continuing to flow process gas through the catalyst as shown by the flow of NO$_x$ and SO$_2$ during the regeneration step.

Example 3

In this example, a deNO$_x$ catalyst was contacted with a process gas containing 7 ppm of SO2. The subsequently deactivated catalyst was regenerated by contacting it with steam at a temperature of 260° C. for 24 hours. During the regeneration, the catalyst was contacted with a stream comprising 40 vol % steam. The figure depicts the NO$_x$ conversion at a number of temperatures, from 160° C. to 200° C., of the fresh catalyst (A), the catalyst after contacting with process gas for 48 hours (B), the catalyst after contacting with process gas for 96 hours (C); and the catalyst after the regeneration step (D). As can be seen from the figure, the regeneration was effective at restoring the NO$_x$ conversion rate of the catalyst to substantially the same NO$_x$ conversion rate as the fresh catalyst.

That which is claimed is:

1. A method for regenerating a deNO$_x$ catalyst comprising contacting the catalyst with a stream comprising process gas, steam, and optionally air, at a temperature in the range of from 250 to 390° C., wherein the steam is present in an amount of 10 to 50 vol. % of the total stream.

2. The method of claim 1, wherein the catalyst is contacted with steam at a temperature in the range of from 290 to 350° C.

3. The method of claim 1, wherein the catalyst is contacted with steam at a temperature in the range of from 310 to 350° C.

4. The method of claim 1, wherein the regeneration is carried out for a time period of from 5 to 168 hours.

5. The method of claim 1, wherein the regeneration is carried out for a time period of from 24 to 48 hours.

6. The method of claim 1, wherein the deNO$_x$ catalyst comprises one or several of the following elements: titanium, tungsten, molybdenum, vanadium or other compounds known to be suitable for the conversion of nitrogen oxides to nitrogen and water.

* * * * *